(12) United States Patent
Arrow et al.

(10) Patent No.: US 6,226,751 B1
(45) Date of Patent: May 1, 2001

(54) METHOD AND APPARATUS FOR CONFIGURING A VIRTUAL PRIVATE NETWORK

(75) Inventors: Leslie J. Arrow, Mountain View; Henk J. Bots, Hollister; Mark R. Hoke, San Jose; William E. Hunt, Saratoga; Russell C. Jones, San Jose; Quentin C. Liu, Cupertino, all of CA (US)

(73) Assignee: VPNet Technologies, Inc., Milpitas, CA (US)

( * ) Notice: Subject to any disclaimer, the term of this patent is extended or adjusted under 35 U.S.C. 154(b) by 0 days.

(21) Appl. No.: 09/062,507

(22) Filed: Apr. 17, 1998

(Under 37 CFR 1.47)

(51) Int. Cl.⁷ .............................. G06F 15/16; G06F 11/30; G06F 12/14; H04L 9/00; H04L 9/32
(52) U.S. Cl. .......................... 713/201; 709/227; 709/245; 370/351; 370/409
(58) Field of Search .................................... 713/201, 200; 709/227, 228, 1, 230, 245, 232, 238, 220, 221, 222, 249; 370/396, 397, 398, 399, 409, 351

(56) References Cited

U.S. PATENT DOCUMENTS

| | | | |
|---|---|---|---|
| 5,606,668 | * | 2/1997 | Shwed .................................. 713/200 |
| 5,623,492 | * | 4/1997 | Teraslinna ........................... 370/397 |
| 5,835,726 | * | 11/1998 | Shwed et al. ....................... 713/200 |
| 5,918,018 | * | 6/1999 | Gooderum et al. ................. 713/200 |
| 5,968,176 | * | 10/1999 | Nessett et al. ....................... 713/200 |

FOREIGN PATENT DOCUMENTS

| | | | |
|---|---|---|---|
| 95/01023 | * | 1/1995 | (WO) ............................ H04L/12/18 |
| 97/00471 | * | 1/1997 | (WO) . | |

* cited by examiner

*Primary Examiner*—Gail Hayes
*Assistant Examiner*—Christopher Revak
(74) *Attorney, Agent, or Firm*—Park, Vaughan & Fleming LLP

(57) ABSTRACT

The present invention provides a method and an apparatus for establishing a virtual private network that operates over a public data network. One embodiment of the present invention includes a system that selects a plurality of entities coupled to the public data network to include in the virtual private network. The system next assembles a plurality of identifiers for the plurality of entities. These identifiers are used to identify communications between the plurality of entities, so that these communications can be transferred securely over the public data network. A variation on this embodiment includes defining encryption, authentication and compression parameters for the virtual private network. In another variation, selecting the plurality of entities includes, assembling entities coupled to the public data network into groups, and selecting groups of entities to include in the virtual private network. Another variation includes defining access control rules specifying types of communications that are allowed to pass through virtual private network units. These virtual private network units are typically used to couple local area networks to the public network so that secure communications on the public network pass through the virtual private network units. Yet another variation on this embodiment includes defining address translation rules for virtual private network units coupled to the public data network. These address translation rules are used to translate local network addresses to public network addresses.

27 Claims, 8 Drawing Sheets

METHOD AND APPARATUS FOR CONFIGURING A VIRTUAL PRIVATE NETWORK

RELATED APPLICATION

The subject matter of this application is related to the subject matter in a co-pending non-provisional application entitled, "METHOD AND APPARATUS FOR MANAGING A VIRTUAL PRIVATE NETWORK," by inventor Quentin C. Liu, having Ser. No. 09/013,743, and a filing date of Jan. 27, 1998.

BACKGROUND

1. Field of the Invention

The present invention relates to the field of data communication. More specifically, the present invention relates to a method and apparatus for configuring secure virtual private networks that operate over public or otherwise insecure data communication infrastructures.

2. Related Art

In recent years organizations have come to rely heavily on the ability to communicate data electronically between members of the organization. Such communications typically include electronic mail and file sharing or file transfer. In a centralized, single site organization, these communications are most commonly facilitated by a local area network (LAN) installed and operated by the enterprise.

Preventing unauthorized access to data traversing an enterprise's LAN is relatively straightforward. As long as intelligent network management is maintained, unauthorized accesses to data traversing an enterprise's internal LAN can be prevented. It is when the enterprise spans multiple sites that security threats from the outside become a considerable problem.

For distributed enterprises that want to communicate data electronically several options exist today; but each has associated disadvantages. The first option is to interconnect the offices or various sites with dedicated, or private, communication connections, often referred to as leased lines. This is the traditional method that organizations use to implement a wide area network (WAN). The disadvantages of implementing an enterprise-owned and controlled WAN are obvious: they are expensive, cumbersome and frequently underutilized if they are configured to handle the peak capacity requirements of the enterprise. The obvious advantage is that the lines are dedicated for use by the enterprise and are therefore reasonably secure from eavesdropping or tampering by intermediate third parties.

An alternative to dedicated communication lines is for an enterprise to handle inter-site data distributions over the emerging public network space. In recent years, the Internet has evolved from being primarily a tool for scientists and academics into an efficient mechanism for global communications. The Internet provides electronic communications paths between millions of computers by interconnecting the various networks upon which those computers reside. It has become commonplace, even routine, for enterprises, even those in non-technical fields, to provide Internet access to at least some portion of the computers within the enterprises. For many businesses this facilitates communications with customers and potential business partners as well as to geographically distributed members of the organization.

Distributed enterprises have found that the Internet is a convenient mechanism for providing electronic communications between members of the enterprise. For example, two remote sites within an enterprise may each connect to the Internet through a local Internet Service Provider (ISP). This enables the various members of the enterprise to communicate with other sites on the Internet, including those within their own organization. A large disadvantage of using the Internet for intra-enterprise communications is that the Internet is a public network. The route by which data communication travel from point to point can vary on a per packet basis, and is essentially indeterminate. Furthermore, the data protocols for transmitting information over the constituent networks of the Internet are widely known, leaving electronic communications susceptible to interception and eavesdropping with packets being replicated at most intermediate hops. An even greater concern is the fact that communications can be modified in transit or even initiated by impostors. With these disconcerting risks, most enterprises are unwilling to subject their proprietary and confidential internal communications to the exposure of the public network space. For many organizations it is common today to not only have Internet access provided at each site, but also to maintain the existing dedicated communications paths for internal enterprise communications, with all of the attendant disadvantages described above.

To remedy this problem, devices have been developed to encrypt and decrypt communications travelling across a public network. A source node desiring to send a packet across a public network to a destination node first sends the packet to a local encryption device that encrypts the packet. The local encryption device forwards the encrypted packet across the public network to a decryption device that decrypts the packet, and forwards the decrypted packet to the destination node.

However, these encryption and decryption devices are somewhat inflexible because they encrypt all packets travelling between source and destination sites. In some cases it is desirable to allow some communications between sites to be encrypted, while allowing other communications to proceed without encryption. For example, an organization may include a plurality of geographically-distributed local area networks that are coupled together through a public data network, such as the Internet. In order to protect data travelling over the public network, the organization can install encryption/decryption devices between the local area networks and the public data network. However, these encryption/decryption devices will encrypt and decrypt all of the traffic to and from the public network. Hence, communications originating from other sources on the public network, such as email from customers, will require separate communication channels that are not encrypted.

Furthermore, it is desirable to provide secure communications within sub-units of an organization. For example, it may be desirable to allow members of a sub-unit, such as finance, to communicate securely with each other, while excluding other sub-units, such as engineering from having access to the information. In order to accomplish this using existing encryption and decryption devices, it is necessary to provide additional encryption and decryption devices for the different sub-units, and these additional encryption and decryption devices must be coupled to systems that belong to a sub-unit. Consequently, it is not possible to use one device to encrypt and decrypt data for each LAN, because a given LAN typically includes users from different sub-units. Additionally, it is often necessary to set up matching pairs of encryption and decryption devices for each pair of local area networks to be linked securely across the public network, because the encryption and decryption devices are configured to operate in matched pairs.

What is needed is a system for facilitating secure communications across a public network that is able to selectively encrypt and decrypt communications based upon the identities of entities that are sending and receiving the messages.

SUMMARY

The present invention provides a method and an apparatus for establishing a virtual private network that operates over a public data network. One embodiment of the present invention includes a system that selects a plurality of entities coupled to the public data network to include in the virtual private network. The system next assembles a plurality of identifiers for the plurality of entities. These identifiers are used to identify communications between the plurality of entities, so that these communications can be transferred securely over the public data network. A variation on this embodiment includes defining encryption, authentication and compression parameters for the virtual private network. In another variation, selecting the plurality of entities includes, assembling entities coupled to the public data network into groups, and selecting groups of entities to include in the virtual private network. Another variation includes defining access control rules specifying types of communications that are allowed to pass through virtual private network units. These virtual private network units are typically used to couple local area networks to the public network so that secure communications on the public network pass through the virtual private network units. Yet another variation on this embodiment includes defining address translation rules for virtual private network units coupled to the public data network. These address translation rules are used to translate local network addresses to public network addresses.

The above embodiment of the present invention facilitates secure communications between members of virtual private networks. These virtual private networks are defined based upon the addresses or identities of entities sending and receiving messages. This allows virtual private networks to be flexibly created and modified to include different members. Additionally, a single virtual private network unit (VPN unit) can be used to couple a LAN to a public network. This single VPN unit can facilitate communications for many virtual private networks, each involving a different group of nodes on the LAN and different groups of nodes from other LANs.

DEFINITIONS

Figure 1:
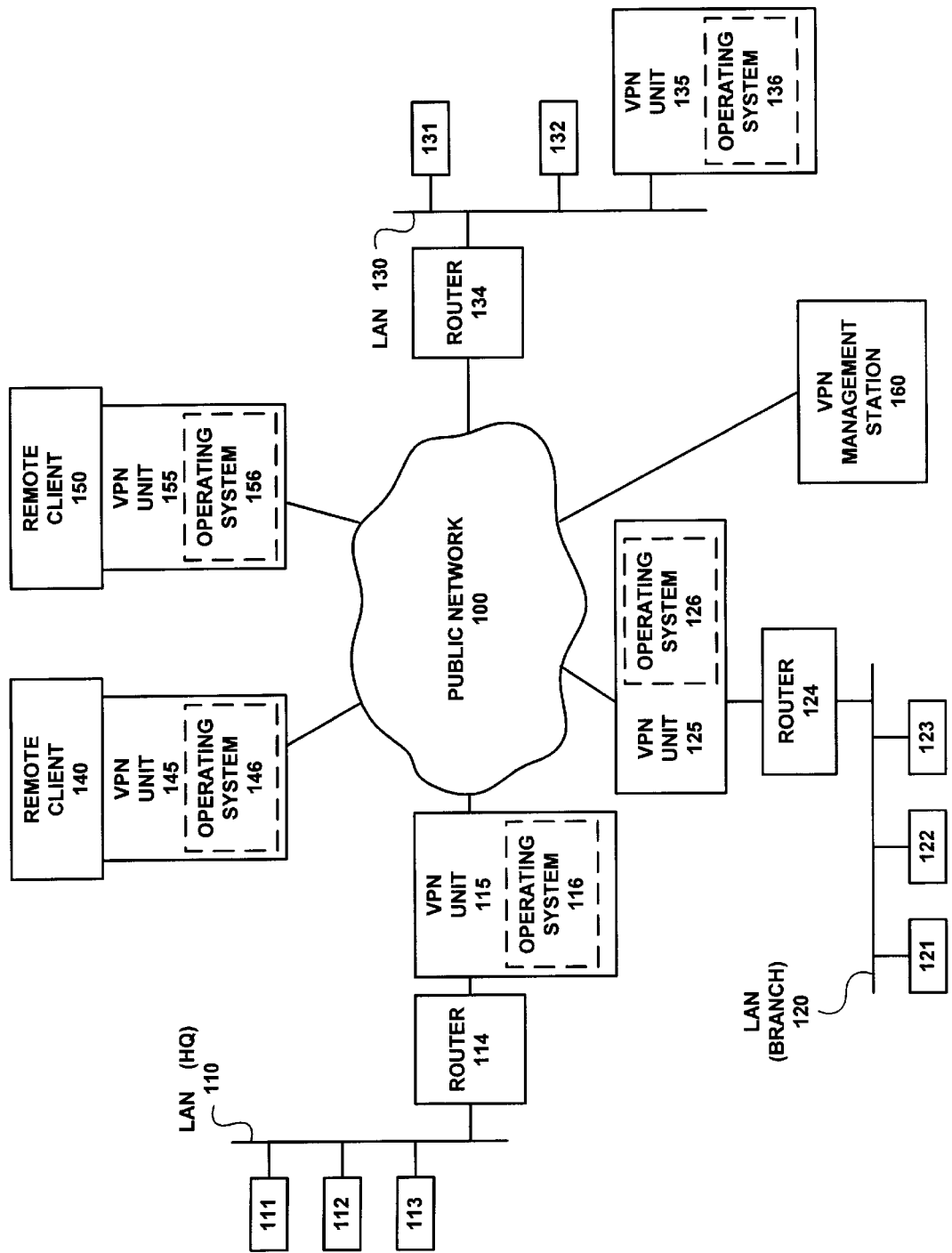
FIG. 1 illustrates a public network 100 including VPN units 115, 125, 135, 145, and 155 operating under control of VPN management station 160 in accordance with an aspect of the present invention.

Configuration Parameters—parameters sent to a VPN unit to configure the VPN unit to appropriately handle communications between members of VPNs.

Group of Nodes—a group of nodes on a public network. In one variation, these nodes belong to the same local network. In another variation, these nodes are specified by at least one net/mask pair.

Local Address—an address on the same enterprise network (or local network), wherein the enterprise network is separated logically or physically from a public data network by a VPN unit.

Local Network—an enterprise network (or a local network) separated logically or physically from a public data network by a VPN unit.

Net/Mask Pair—a specification for a group of network addresses including a network ID and a network address mask.

Network Group—same as group of nodes.

Non-local Address—an address on a different enterprise network (or local network), wherein enterprise networks are separated logically or physically from a public data network by a VPN unit.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Although the present invention is described predominantly in terms of utilizing the Internet as a communications medium, the concepts and methods are broad enough to accomplish the implementation of secure virtual private networks over other public or insecure communications media. Throughout this detailed description, numerous specific details are set forth, such as particular encryption or key management protocols, in order to provide a thorough understanding of the present invention. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In many instances, components implemented by the present invention are described at an architectural, functional level. Many of the elements may be configured using well-known structures, particularly those designated as relating to various compression or encryption techniques. Additionally, for logic to be included within the system of the present invention, functionality and flow diagrams are described in such a manner that those of ordinary skill in the art will be able to implement the particular methods without undue experimentation. It should also be understood that the techniques of the present invention may be implemented using a variety of technologies. For example, the VPN unit to be described further herein may be implemented in software running on a computer system, or implemented in hardware utilizing either a combination of microprocessors or other specially designed application specific integrated circuits, programmable logic devices, or various combinations thereof.

Description of Virtual Private Networks

FIG. 1 illustrates a public network 100 including VPN units 115, 125, 135, 145, and 155 operating under control of VPN management station 160 in accordance with an embodiment of the present invention. Public network 100 may be any type of communication channel, including, but not limited to, data networks such as the Internet. VPN unit 115 couples headquarters local area network (LAN) 110 to public network 100 through router 114. Headquarters LAN 110 is illustrated with three endstations 111, 112, and 113, respectively coupled to headquarters LAN 110. Likewise, VPN unit 125 couples branch LAN 120 to public network 100 through router 124. Branch LAN 120 is shown having a plurality of endstations 121, 122 and 123, respectively, coupled to branch LAN 120. LAN 130 is coupled to public network 100 through router 134. LAN 130 is illustrated in FIG. 1 as comprising of plurality of computers, 131 and 132, coupled to communicate data packets over LAN 130. Note that in LAN 130, VPN unit 135 is not located between router 134 and network 100, but rather is located on LAN 130. In this configuration, secure communications between LAN 130 and public network 100 are "tunneled" through VPN unit 135. The local area networks utilized for data communications within headquarters LAN 110, branch LAN 120, LAN 130 and other sites may adhere to a wide variety of network protocols, the most common of which are Ethernet and Token Ring.

VPN units 145 and 155 couple remote clients 140 and 150, respectively, to public network 100. Remote clients are systems coupled to public network 100 from remote locations. It is frequently desirable for other members of the enterprise who may be on the road or working from home or other remote locations to exchange data with other members of the enterprise. Thus, remote clients 140 and 150 may communicate with the headquarters LAN 110 over long distance telephone lines. Alternatively, remote clients 140 and 150 may have access to public network 100 through local Internet service providers (ISPs). In one embodiment, VPN units 145 and 155 are implemented as hardware modules. In another embodiment, VPN units 145 and 155 are implemented as software modules within remote clients 140 and 150, respectively.

VPN units 115, 125, 135, 145 and 155 include operating systems 116, 126, 136, 146 and 156, respectively, which control the operation of VPN units 115, 125, 135, 145 and 155. The internal structure of these operating systems is described in more detail below with reference to FIG. 7.

VPN management station 160 controls VPN units 115, 125, and 135 through commands and configuration information transmitted to VPN units 115, 125 and 135 through public network 100. VPN management station 160 may be implemented in software running on a computer system, or alternatively may be implemented in hardware utilizing either a combination of microprocessors or other specially designed application specific integrated circuits, programmable logic devices, or various combinations thereof. The structure of VPN management station 160 is described in more detail below with reference to FIGS. 4 and 5.

LANs for the particular sites illustrated in FIG. 1 ultimately connect to public network 100 through associated routing or gateway devices, which are identified as routers 114, 124 and 134, respectively. Data packets conveyed between the various sites illustrated in FIG. 1 generally traverse a plurality of additional routing devices on their way between the source and destination sites for the packets. The mechanisms for data packet transfers over a public network 100, such as the Internet are well known and are not described in great detail herein. In one embodiment, packets are assembled in accordance with the Internet Protocol (IP) and are referred to herein as IP packets regardless of the version of the Internet protocol presently in effect.

The illustrated placement of VPN units in the overall system architecture represents only one placement choice. Other configurations are possible. The only requirement is that data traffic is routed through the VPN units. In another embodiment, a VPN unit is located on the LAN side of a site's router. VPN units maintain lookup tables for identifying members of specific virtual private network groups.

When a data packet is sent between source and destination addresses that are both members of the same VPN, the VPN unit processes the data packet from the sending side ensuring that it is compressed, if necessary, properly encrypted, and that authentication information is added to it. Likewise, the receiving VPN unit servicing the destination site will detect that a packet is being propagated between members of the same VPN. The receiving VPN unit authenticates, decrypts and decompresses the packet (if necessary) before forwarding it toward the destination endstation. In this way, secure data communications between end users is achieved in a manner that is transparent to the end users. As described above, in the case of remote clients 140 and 150, VPN units 145 and 155 may be implemented in software, which operates in conjunction with the communication software for connecting the remote client to its associated Internet Service Provider (ISP).

Figure 2:
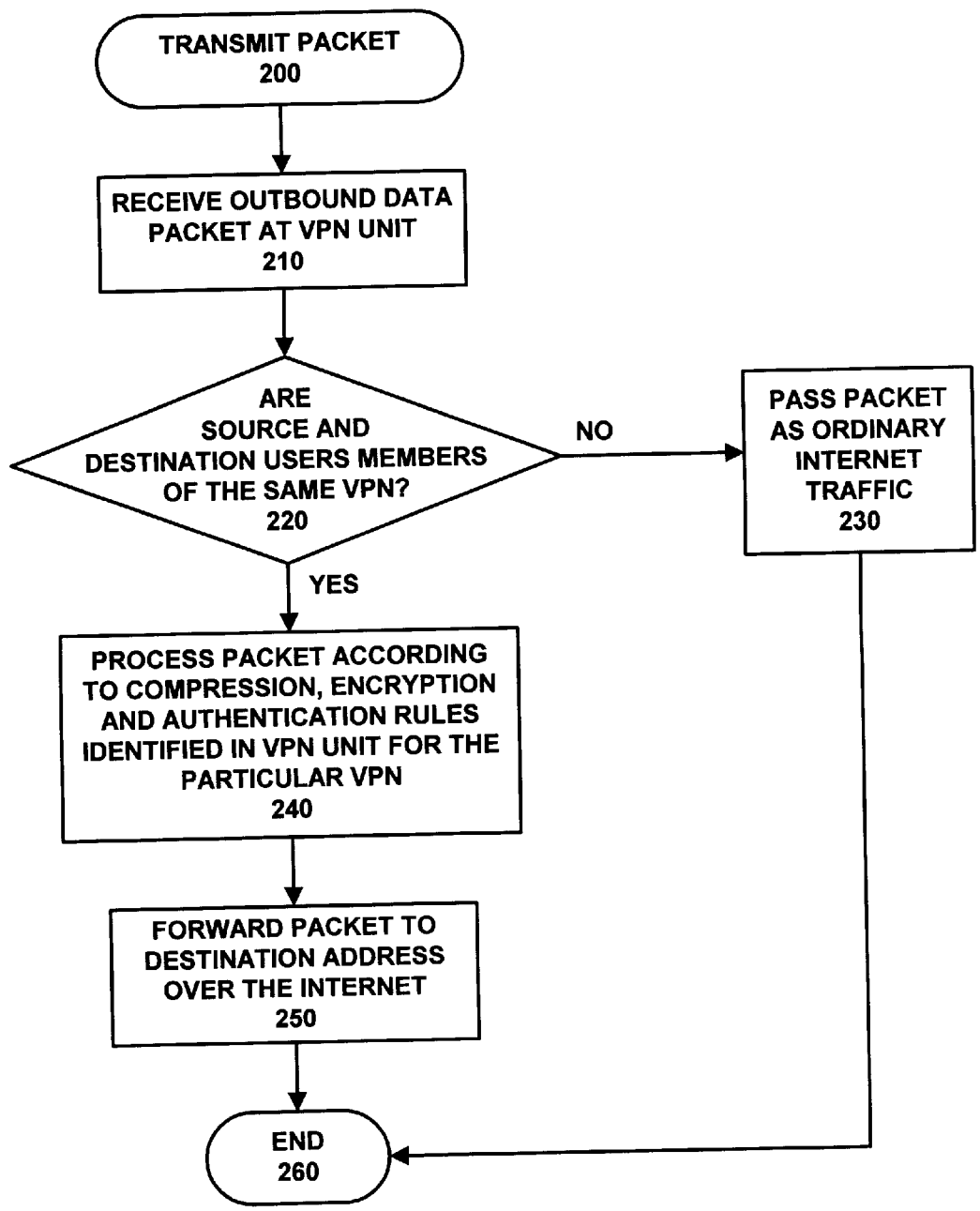
FIG. 2 is a flow chart illustrating the processing of a packet being transmitted from one member of a VPN to another member of the VPN over a public data network in accordance with an aspect of the present invention.

FIG. 2 is a flow chart illustrating the processing of a packet being transmitted from one member of a VPN to another member of the VPN over a public data network in accordance with an embodiment of the present invention. When a data packet originates from an endstation, such as endstation 112 of LAN 110, and it is destined for a remote site, outside of LAN 110, the packet is initially treated as an ordinary Internet data packet. The packet proceeds from endstation 112 over LAN 110 to router 114, which encapsulates the data packet in accordance with the Internet Protocol, forming an outbound IP packet. On its way out of the site, the IP packet passes through the associated VPN unit 115 for the site. The flowchart illustrated at FIG. 2 shows how a VPN unit processes an outbound packet. The transmit procedure 200 begins when the outbound data packet is received at the VPN unit in state 210. At decision box 220, the system determines whether or not the source and destination addresses for the data packet are both members of the same VPN. This determination may be made with reference to lookup tables that are maintained by the VPN units or by reference to other memory mechanisms. This state may be thought of as member filtering for data packets being transmitted between the particular site and the VPN unit which services it. If the source and destination address for the data packet are not both members of the same VPN, then at state 230 the packet is forwarded to the Internet as ordinary Internet traffic from the site, as though the VPN unit were not involved. In this case, the system proceeds to state 260, which is an end state. In an alternative embodiment, the system discards data traffic that is not between members of a VPN, rather than forwarding it as unsecure traffic. In another embodiment, the system provides the option to either pass or discard non-VPN group data traffic.

If, at decision box 220, the system determines that both the source and destination addresses for the data packet are members of the same VPN, the data packet is processed at state 240 undergoing various combinations of compression, encryption and authentication. If a packet is received from a remote client that is not currently authenticated, the system attempts to authenticate the remote client. If authentication is successful, the system dynamically retrieves configuration information for the remote client from a database. The remote client will then retry its communication.

Lookup tables maintained by VPN unit 115 and all of the other VPN units identify members of particular VPNs. They additionally identify whether or not data packets transferred between members of the particular VPN are to be compressed, and if so, what algorithm is used for compression. Many possible compression algorithms are well known, but in one embodiment of the invention, LZW compression is used. The lookup table for the VPN, of which the source and destination addresses are members, also identifies the particular encryption algorithm used for data packets traversing the Internet for the VPN. The lookup table additionally identifies the authentication and the key management protocol information which is used. As an alternative to lookup tables, the VPN unit may be programmed to always use the same algorithms for all VPNs.

The particular packet processing algorithms to be used for VPN traffic may vary, so long as the lookup tables in both the sending and receiving VPN units identify the same compression, encryption and authentication rules and are capable of implementing them for members of the same group.

Note that a single VPN unit may serve multiple VPNs, and that particular network addresses may be members of multiple VPNs. Thus, at state 240, when a packet is destined from one member of the VPN to another, the packet is processed according to the compression, encryption and authentication rules identified in the VPN unit tables for that particular VPN. Then, at state 250, the processed packet is forwarded toward the destination address over the Internet. The sending procedure ends at state 260.

Figure 3:
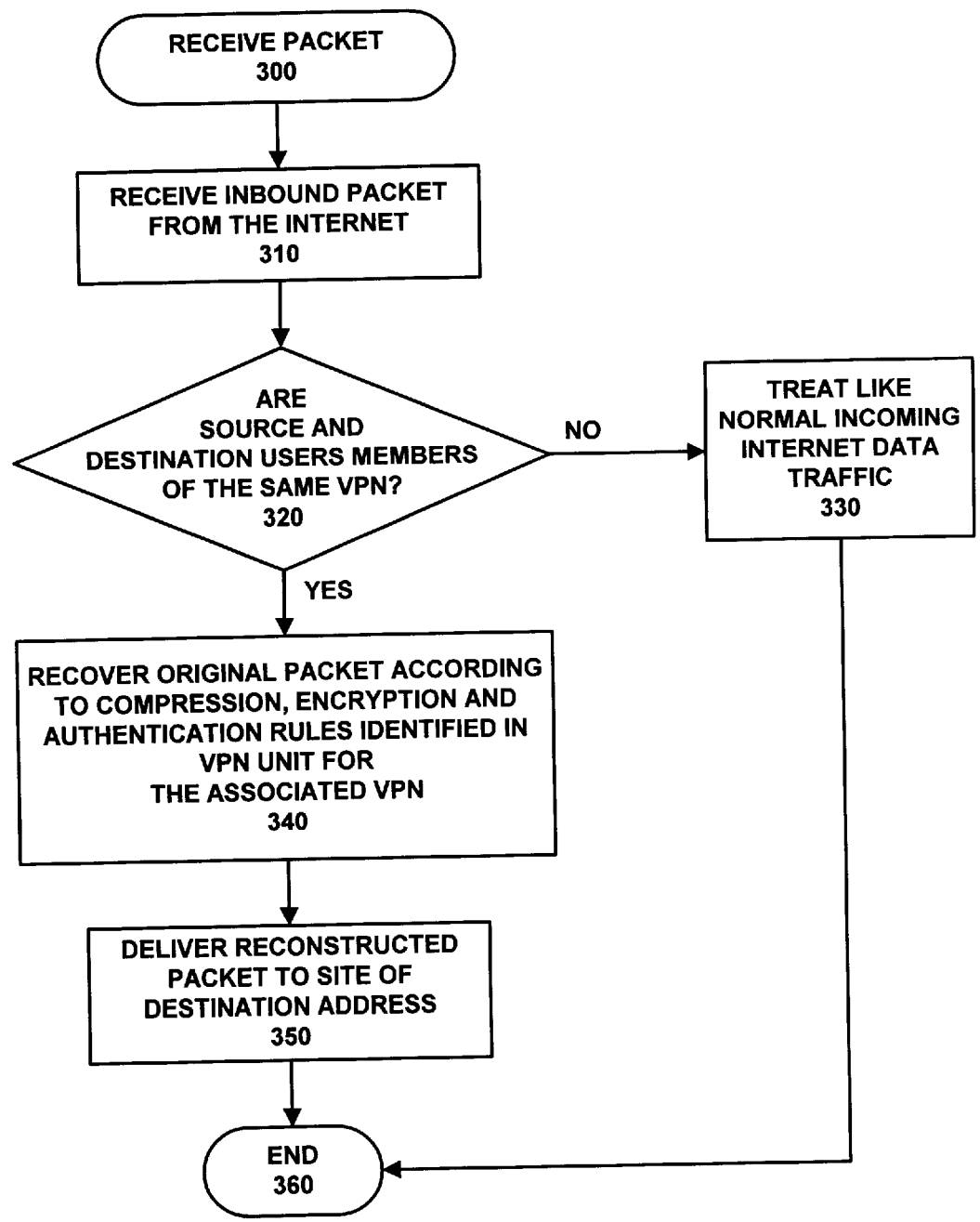
FIG. 3 is a flow chart illustrating the processing of a packet being received over a public data network by one member of a VPN from another member of the VPN in accordance with an aspect of the present invention.

FIG. 3 is a flow chart illustrating the processing of a packet being received over a public data network by one member of a VPN from another member of the VPN in accordance with an embodiment of the present invention. This packet receiving procedure 300 begins at state 310 when an inbound data packet is received from the Internet at the receiving VPN unit. At decision box 320, the inbound data packet is examined to determine if the source and destination addresses of the data packet are both members of the same VPN. (It is assumed that the lookup tables maintained by all of the VPN units are all consistent.) If the inbound data packet is determined not to be VPN traffic, then the packet is passed through and forwarded to the receiving site as though it were normal Internet data traffic at state 330. The system then proceeds to state 360, which is an end state. In an alternative embodiment, the system discards incoming data traffic that is not from an identified member of a VPN supported by the VPN unit. In another embodiment, the system provides the option to either pass or discard non-VPN group data traffic.

For data packets that are determined to be VPN traffic at decision box 320, the VPN unit processes the inbound packet to recover the original data packet as it was provided from the source endstation. The lookup table maintained by the receiving VPN unit identifies the compression, encryption and authentication rules used for the VPN and reconstructs the original IP packet in accordance with those rules at state 340. Then, the reconstructed packet will be delivered to the site of the destination address at state 350. The system then proceeds to state 360, which is an end state.

Description of VPN Management Station

Figure 4:
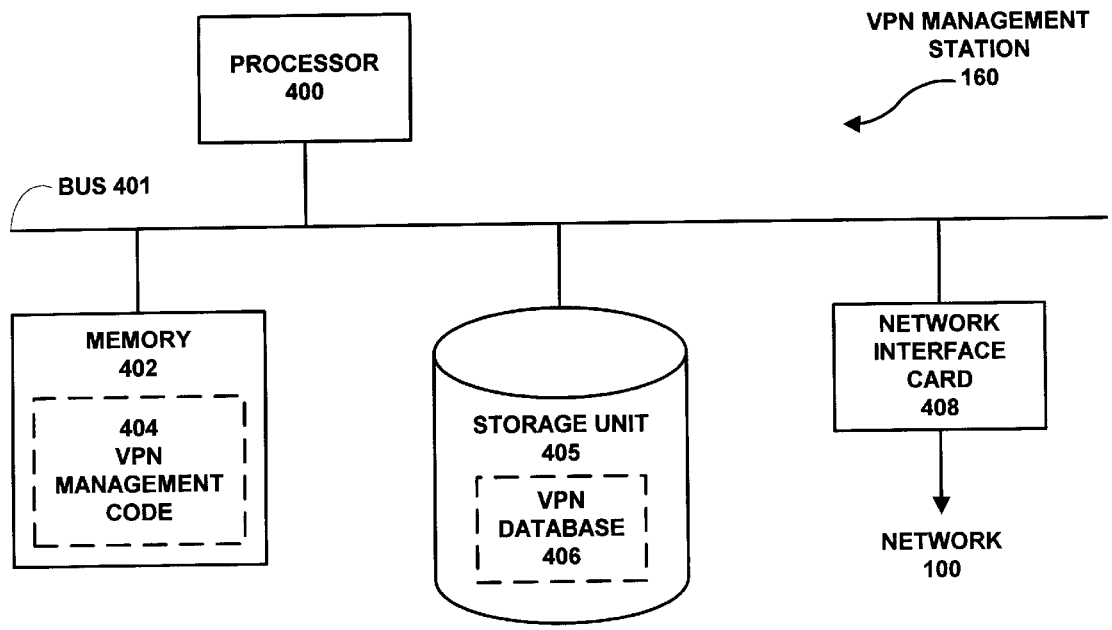
FIG. 4 is a block diagram illustrating part of the internal structure of VPN management station 160 from FIG. 1 in accordance with an aspect of the present invention.

FIG. 4 is a block diagram illustrating part of the internal structure of VPN management station 160 in accordance with an embodiment of the present invention. In general, VPN management station 160 may be any type of computational system coupled to public network 100. In the embodiment illustrated in FIG. 4, VPN management station 160 includes processor 400 coupled to memory 402, storage unit 405 and network interface card 408 through bus 401. Memory 402 includes VPN management code 404, which contains instructions and data to manage VPN units coupled to network 100. Storage unit 405 includes database 406, which includes information reflecting the structure of virtual private networks supported by the system as well as the configuration of the VPN units supported by VPN management station 160. Network interface card 408 couples VPN management station 160 to network 100. The operations performed by VPN management station 160 are discussed in more detail below.

Figure 5:
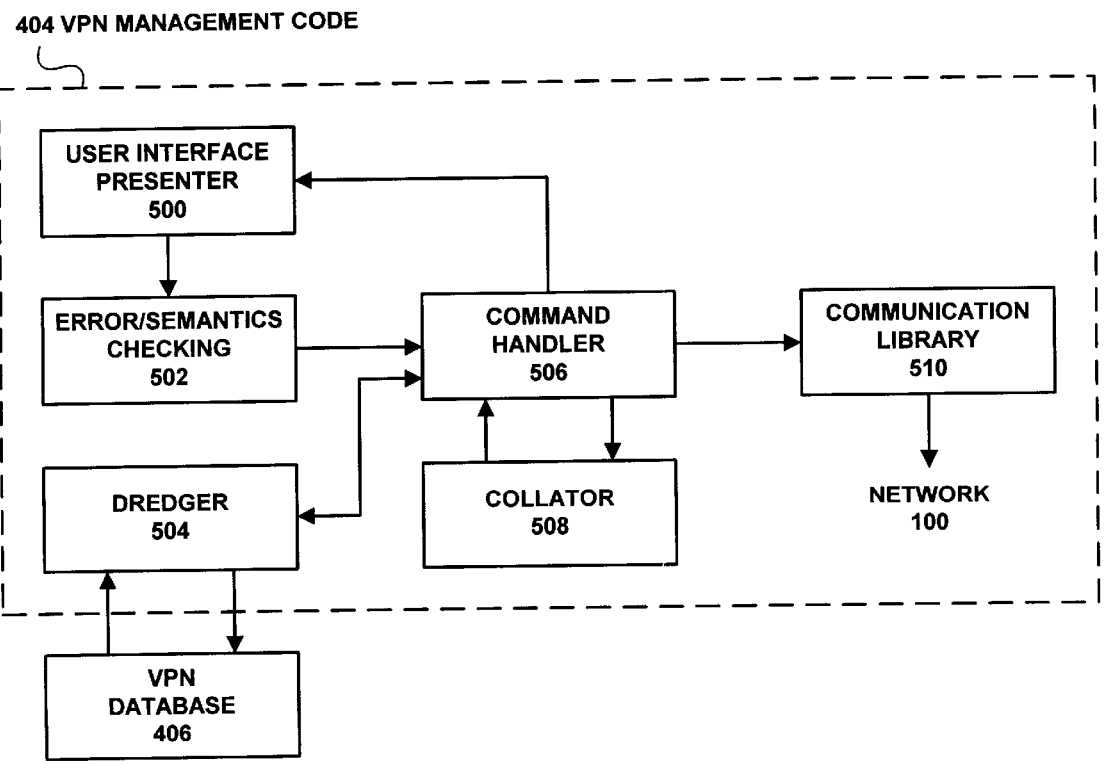
FIG. 5 is a block diagram of the software architecture contained within VPN management station 160 from FIG. 1 in accordance with an aspect of the present invention.

FIG. 5 is a block diagram of part of the software architecture contained within VPN management station 160 in accordance with an embodiment of the present invention. As noted above, VPN management station 160 includes VPN management code 404 in memory 402 and VPN database 406 on storage unit 405. VPN management code 404 includes user interface presenter 500, which receives input from a system user. This input feeds through error/semantics checking module 502 before feeding into command handler 506. Command handler 506 is coupled to dredger 504, collator 508 and communication library 510. Command handler 506 executes the commands received through user interface presenter 500 by manipulating dredger 504, collator 508 and communication library 510. Dredger 504 is coupled to and performs searches through and performs updates to VPN database 406. Communication library 510 contains functions to communicate with network 100. Collator 508 sorts and manipulates network addresses to produce configuration information for VPN units.

During operation, the system outlined in FIG. 5 operates as follows. A system user inputs a command into user interface presenter 500. This command feeds through error/semantics checker module 502 before arriving at command handler 506. Command handler 506 may present additional screens or queries to the user through user interface presenter 500. Command handler then retrieves information regarding the groups of nodes, VPNs and VPN units affected by the command. Command handler 506 takes this information and uses it to produce configuration information for VPN units using collator 508. This configuration information is communicated to the VPN units using functions from communication library 510, which communicate across network 100.

Description of High Level Objects

Figure 6:
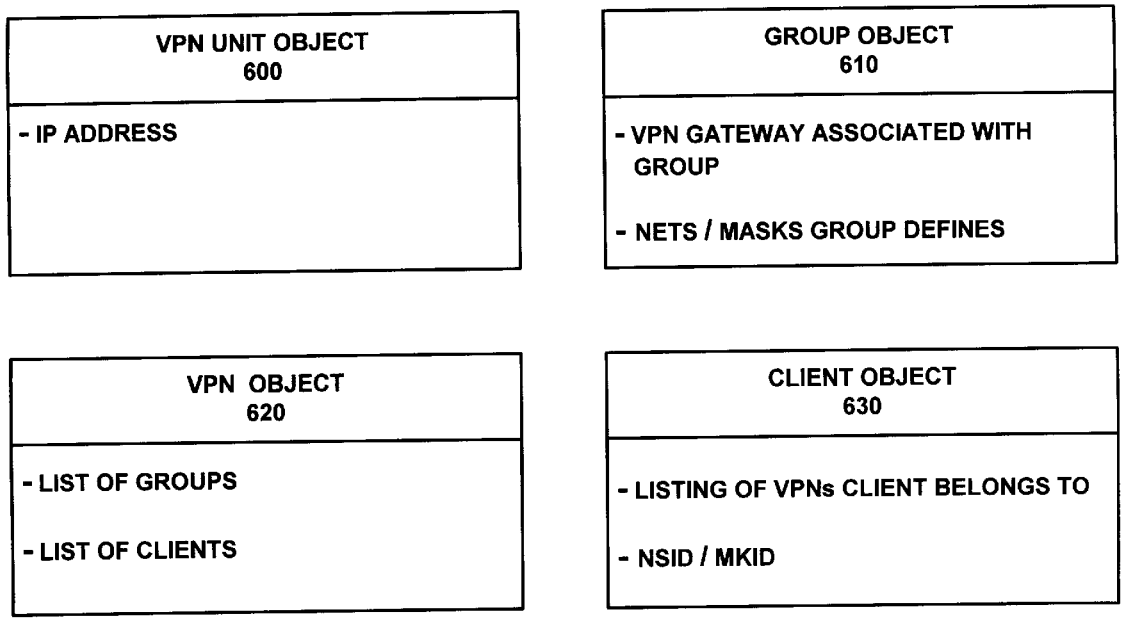
FIG. 6 is a diagram of some of the data objects operated on by high-level commands in accordance with an aspect of the present invention.

FIG. 6 is a diagram of some of the data objects operated on by high-level commands in accordance with an embodiment of the present invention. FIG. 6 includes VPN unit object 600, group object 610, VPN object 620 and client object 630. A user manipulating VPN management station 160 specifies sequences of operations on the above-listed objects. Hence, the user does not have to directly manipulate lower level addressing information to configure VPN units. This lower level addressing information is automatically generated by VPN management station 160 and sent to the VPN units. A VPN unit object 600 is created for each VPN unit in the network. A VPN unit object comprises a number of parameters including the Internet Protocol (IP) address of the VPN unit. A group object 610 is created for groups of network nodes on public network 100. In this embodiment, a group object includes an identifier for the VPN unit associated with the group and the net/mask pairs the group defines. A VPN object 620 is created for each virtual private network supported by VPN management station 160. A VPN object 620 comprises a number of attributes including, algorithms for encryption, authentication and compression, a list of groups and a list of remote clients included in the underlying VPN. A client object 630 is created for each remote client supported by VPN management station 160. A client object comprises a number of attributes including a listing of the virtual private networks the client belongs to and the NSID/MKID identifier for the remote client. In one embodiment, the NSID, or name space ID is the MD5 hash of a user name, and the MKID is the master key ID of the domain. These serve to identify the remote client.

Description of Operating System

Figure 7:
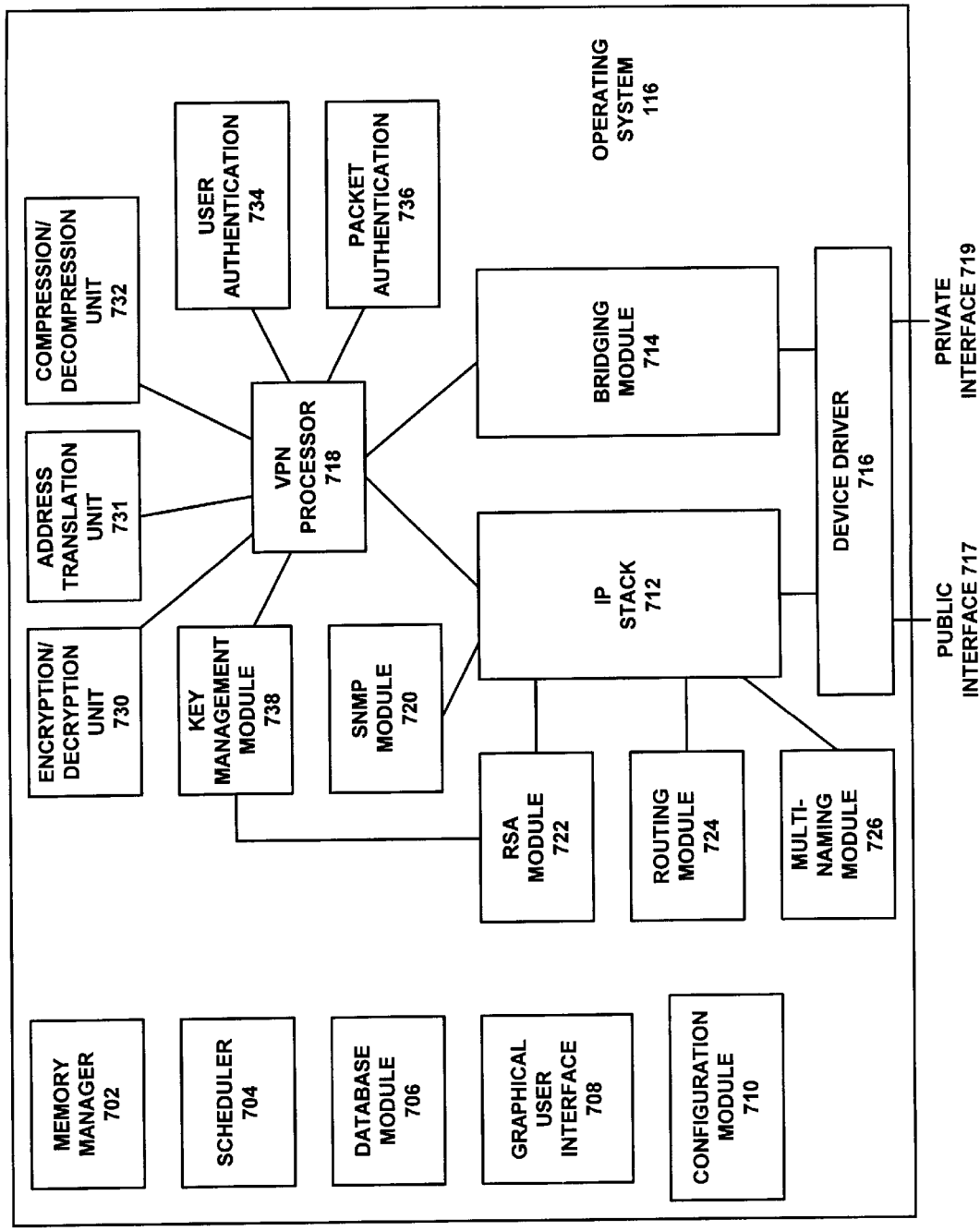
FIG. 7 is a block diagram of operating system 116 from FIG. 1 in accordance with an aspect of the present invention.

FIG. 7 is a block diagram of operating system 116 from FIG. 1 in accordance with an aspect of the present invention. Operating system 116 includes a number of modules, the most central of which is VPN processor 718, which controls the operation of operating system 116.

In the illustrated embodiment, VPN processor 718 communicates with a number of modules, including IP stack 712 and bridging module 714. IP stack 712 and bridging module are coupled through device driver 716 to private interface 719 and public interface 717. Public interface 717 is coupled to a public network, such as public network 100 from FIG. 1. Private interface 719 is coupled to a private network, such as LAN 110 from FIG. 1. The function of operating system 116 is to filter and manipulate communications between public network 100 and LAN 110. Device driver 716 facilitates communications with public interface 717 and private interface 719. In one embodiment, device driver 716 facilitates communications using the 10-BASE-T protocol.

Bridging module 714 provides a logical connection between private interface 719 and public interface 717. In one embodiment, bridging module 714 does so by supporting level two bridging of medium access control (MAC) addresses. Note that bridging operations are selectively controlled by VPN processor 718 so that communications within a VPN are encrypted before being transmitted across public network 100.

IP stack 712 handles the protocol layers involved in translating communications from public interface 717 and private interface 719 into a form suitable for manipulation by VPN processor 718. A number of modules are coupled to IP stack 712, including multi-naming module 726, routing module 724, RSA module 722, and SNMP module 720.

Multi-naming module 726 provides multiple Internet Protocol (IP) addresses for VPN unit 115 (from FIG. 1), which is controlled by operating system 116. Routing module 724 performs standard network routing functions for VPN unit 115. More specifically, routing module 724 determines where messages should be forwarded to next in their journey to their ultimate destination. RSA module 722 provides public key/private key security functions, including exchanging of certificates for authentication functions with remote entities. Among its other functions, RSA module 722 supports management of encryption keys and loading of configuration information into VPN unit 115 from VPN management station 160 (from FIG. 1). To this end, RSA module 722 communications with key management module 738, which itself communicates with VPN processor 718. Key management module 738 sets up keys for encryption and authentication functions. Simple Network Management Protocol SNMP module 720 gathers information and statistics from IP stack 712 that a system administrator might be interested in, such as communication traffic statistics.

VPN processor 718 is additionally coupled to other modules including, encryption-decryption unit 730, address translation unit 731, compression-decompression unit 732, user authentication module 734 and packet authentication module 736.

Encryption-decryption unit 730 encrypts and decrypts communications sent and received through public interface 717. In one embodiment, encryption-decryption unit 730 includes an application specific integrated circuit (ASIC) that performs the encryption and decryption operations.

Address translation unit 731 supports translation from private addresses to public addresses, so that communications on LAN 110 can be converted into a form suitable for transmission across public network 100. More specifically, address translation unit 731 supports static translation, dynamic translation and port translation. In order to perform these functions address translation unit 731 includes pointers from IP stack 712, bridging module 714 and VPN processor 718. In one embodiment, address translation unit 731 additionally implements access control functions that specify they types of communications that are allowed to pass through associated VPN unit 115.

Compression-decompression unit 732 provides compression and decompression functions for data sent across public network 100. In one embodiment, compression-decompression unit 732 includes special-purpose hardware to perform the compression and decompression functions.

User authentication module 734 authenticates system users, whereas packet authentication module 736 authenticates individual packets.

Configuration module 710 is coupled to a number of functional units within operating system 116. It facilitates the loading of configuration information from VPN management station 160 (from FIG. 1) into VPN unit 115. This configuration information includes information specifying how to implement the VPNs defined by the system.

Additionally a number of operating system functions are performed by other modules within operating system 116. Memory manager 702 performs memory management functions. Scheduler 704 schedules tasks within operating system 116. Database module 706 stores configuration and other information for operating system 116. Graphical user interface module 708 facilitates communication with a user of VPN unit 115. The above-listed modules for performing operating system functions are widely used by other modules within operating system 116.

Examples of Operations

Figure 8:
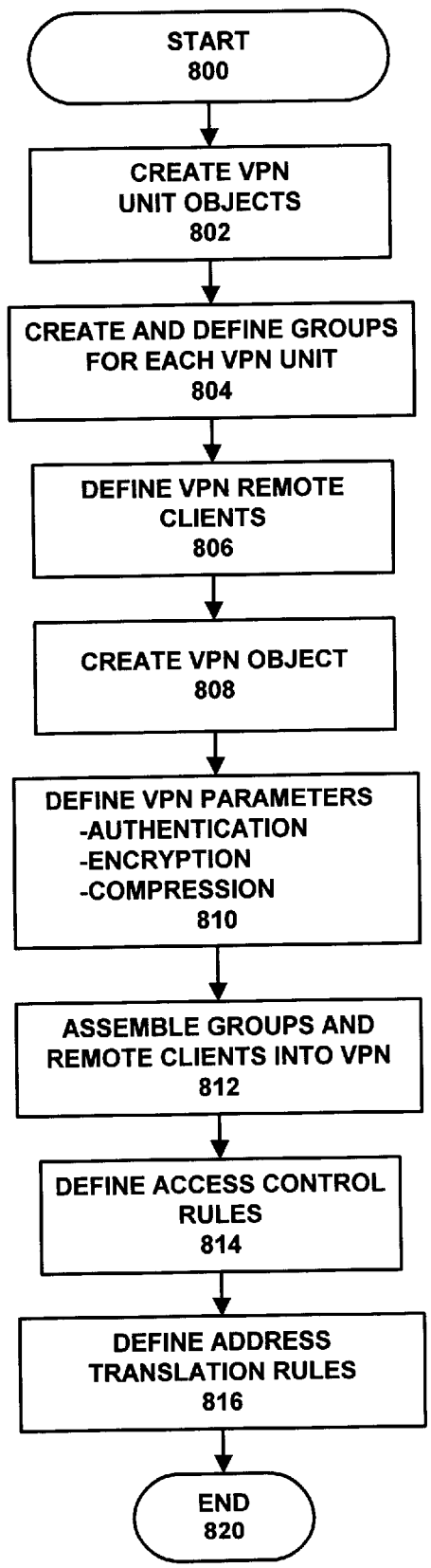
FIG. 8 is a flow chart illustrating some of the operations performed by a VPN system manager to create a VPN in accordance with an aspect of the present invention.

FIG. 8 is a flow chart illustrating some of the operations performed by a VPN system manager to create a VPN in accordance with an embodiment of the present invention. The system manager starts at state 800 and proceeds to state 802. In state 802, the system manager issues commands to create VPN unit objects corresponding to physical VPN units on network 100. Before creating VPN unit objects and adding those VPN unit objects into the VPN unit database, the system manager authenticates to each VPN unit, and each VPN unit authenticates to the system manager. The system manager then proceeds to state 804. In state 804, the system manager issues commands to create and define groups of entities. These entities may be nodes on a computer network that are addressed by IP address identifiers. These entities may also be system users that are identified by user IDs. The system manager then proceeds to state 806, in which the system manager defines VPN remote clients. Remote clients can connect to a VPN from remote locations, and are identified by NSID/MKID identifiers as is described above. The system manager then proceeds to state 808, in which the system manager issues a command to create a VPN object. The system manager then proceeds to state 810. In state 810, the system manager defines VPN parameters for authentication, encryption, and compression functions to be associated with the newly created VPN. Next, the system manager proceeds to state 812. In state 812, the system manager assembles groups of entities and remote clients into a VPN. This process is repeated for each VPN the system manager desires to create. The system manager then proceeds to state 814. In state 814, the system manager defines access control rules for VPN units. These access control rules specify which types of communications are allowed to pass through a VPN unit. For example, an access control rule may specify that communications between non-members of a VPN and members of the VPN are not allowed to pass through a particular VPN unit. Next, the system manager proceeds to state 816.

In state 816, the system manager specifies address translation rules for each VPN unit. These address translation rules support static translation, dynamic translation and port translation. For example, they make it possible to use the same address for two different nodes that are located on different local area networks that are coupled to the public network through VPN units. The VPN units use the address translation rules to translate the same local addresses into different public network addresses. Address translation rules also facilitate mapping multiple local addresses to a single public network address. In one embodiment, this is accomplished by using the same public network address with different port identifiers for different local addresses. The system manager then proceeds to state 820, which is an end state.

Figure 9:
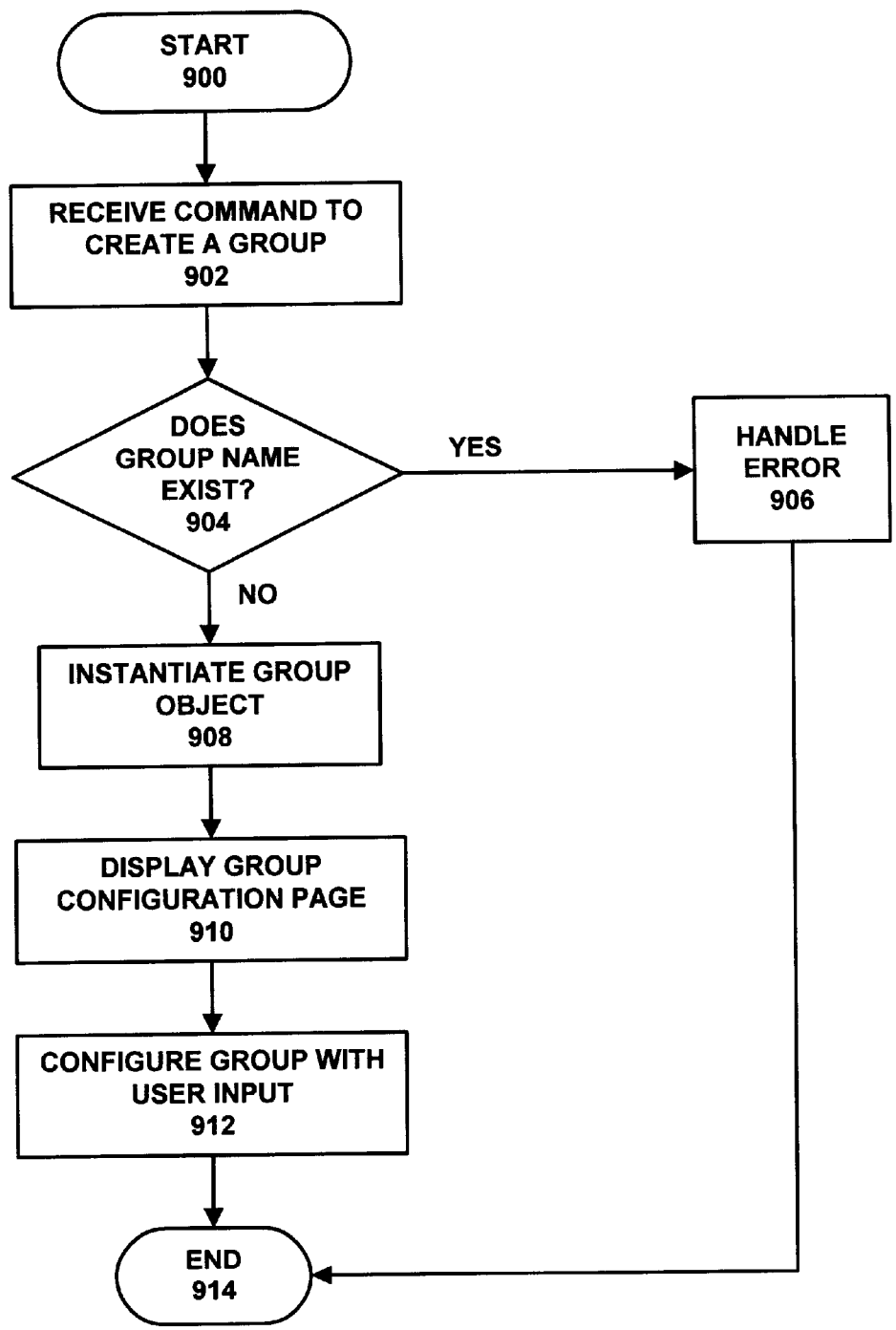
FIG. 9 is a flow chart illustrating some of the operations performed by VPN management station 160 in order to create a group in accordance with an aspect of the present invention.

FIG. 9 is a flow chart illustrating some of the operations performed by VPN management station 160 in order to create a group in accordance with an embodiment of the present invention. The system starts in state 900 and proceeds to state 902. In state 902, the system receives a command to create a group from a VPN system administrator. The system then proceeds to state 904. In state 904, the system determines whether or not the name of the new group already exists. If so, the system proceeds to state 906 in which the system handles the error and then proceeds to state 914, which is an end state. If not, the system proceeds to state 908. In state 908, the system instantiates a group object. The system then proceeds to state 910. In state 910, the system displays a group configuration page. The system then proceeds to state 912. In state 912, the system configures the group with user input entered into the configuration page. The system then proceeds to state 914, which is an end state.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for establishing a virtual private network for facilitating secure communications between entities over a public data network, comprising:

receiving selections for a plurality of entities coupled to the public data network to include in the virtual private network;

wherein the entities reside on local networks coupled to the public data network and are addressed through local network addresses;

assembling a plurality of identifiers for the plurality of entities;

defining address translation rules for virtual private network units coupled to the public data network, the virtual private network units using the address translation rules to translate local network addresses for the local networks into corresponding addresses on the public data network;

using the plurality of identifiers to identify communications between the plurality of entities;

transferring the communications between the plurality of entities securely over the public data network; and wherein transferring the communications involves using the address translation rules to translate local network addresses into addresses on the public data network.

2. The method of claim 1, further comprising defining encryption, authentication and compression parameters for the virtual private network.

3. The method of claim 1, wherein receiving selections for the plurality of entities comprises:

receiving commands to assemble entities coupled to the public data network into groups of at least one entity; and receiving selections for groups of entities to include in the virtual private network.

4. The method of claim 3, wherein each group is associated with a virtual private network unit through which communications between the group and the public data network are routed.

5. The method of claim 1, further comprising defining access control rules specifying types of communications that are allowed to pass through virtual private network units, the virtual private network units being coupled to the public network so that secure communications on the public network pass through the virtual private network units.

6. The method of claim 1, wherein the address translation rules facilitate communicating with multiple entities through a single Internet Protocol (IP) address.

7. The method of claim 1, wherein the plurality of identifiers includes an Internet Protocol (IP) address.

8. The method of claim 1, wherein the plurality of identifiers includes a user identifier that identifies a computer user.

9. The method of claim 1, wherein the plurality of entities includes a computer system.

10. The method of claim 1, wherein the plurality of entities includes a computer user.

11. The method of claim 1, wherein the plurality of entities includes a remote client that can connect to the virtual private network from a remote location.

12. The method of claim 1, wherein receiving selections for the plurality of entities includes receiving selections for the plurality of entities at a virtual private network manager located at a centralized site on the public data network.

13. A method for establishing a virtual private network for facilitating secure communications between entities over a public data network, comprising:
   receiving selections for a plurality of entities coupled to the public data network to include in the virtual private network, wherein selecting the plurality of entities comprises assembling entities into groups of at least one entity, and selecting groups of entities to include in the virtual private network, each group of entities being associated with a virtual private network unit through which communications between the group and the public data network are routed;
   wherein the entities reside on local networks coupled to the public data network and are addressed through local network addresses;
   defining encryption, authentication and compression parameters for the virtual private network;
   defining address translation rules for virtual private network units coupled to the public data network, the virtual private network units using the address translation rules to translate local network addresses for the local networks into corresponding addresses on the public data network;
   assembling a plurality of identifiers for the plurality of entities;
   using the plurality of identifiers to identify communications between the plurality of entities;
   transferring the communications between the plurality of entities securely over the public data network; and
   wherein transferring the communications involves using the address translation rules to translate local network addresses into addresses on the public data network.

14. The method of claim 13, further comprising defining access control rules specifying types of communications that are allowed to and from the plurality of entities.

15. The method of claim 13, wherein the address translation rules facilitate communications with multiple entities through a single Internet Protocol (IP) address.

16. An apparatus for establishing a virtual private network for facilitating secure communications between entities over a public data network, comprising:
   a virtual private network manager coupled to the public data network;
   a selection mechanism, within the virtual private network manager, for receiving selections for a plurality of entities coupled to the public data network to include in the virtual private network, and for assembling a plurality of identifiers for the plurality of entities;
   wherein the plurality of entities reside on local networks coupled to the public data network and are addressed through local network addresses;
   wherein the virtual private network manager is configured to define address translation rules for virtual private network units coupled to the public data network, the virtual private network units using the address translation rules to translate local network addresses to corresponding addresses on the public data network;
   a virtual private network unit, coupled to the public data network, through which communications between entities in the virtual private network are routed;
   an identification mechanism, within the virtual private network unit, that uses the plurality of identifiers to identify communications between the plurality of entities;
   a secure communication mechanism with the virtual private network unit for transferring the communications between the plurality of entities securely over the public data network; and
   wherein the secure communication mechanism is configured to use the address translation rules to translate local network addresses into addresses on the public data network.

17. The apparatus of claim 16, wherein the virtual private network manager is configured to define encryption, authentication and compression parameters for the virtual private network.

18. The apparatus of claim 16, wherein the selection mechanism is configured to receive command to assemble entities coupled to the public data network into groups of at least one entity, and to receive selections for groups of entities to include in the virtual private network.

19. The apparatus of claim 18, wherein each group is associated with a virtual private network unit through which communications between the group of entities and the public data network are routed.

20. The apparatus of claim 16, wherein the virtual private network manager is configured to define access control rules specifying types of communications that are allowed to pass through virtual private network units, the virtual private network units being coupled to the public network so that secure communications on the public network pass through the virtual private network units.

21. The apparatus of claim 16, wherein the address translation rules facilitate communicating with multiple entities through a single Internet Protocol (IP) address.

22. The apparatus of claim 16, wherein the plurality of identifiers includes an Internet Protocol (IP) address.

23. The apparatus of claim 16, wherein the plurality of identifiers includes a user identifier that identifies a computer user.

24. The apparatus of claim 16, wherein the plurality of entities includes a computer system.

25. The apparatus of claim 16, wherein the plurality of entities includes a computer user.

26. The apparatus of claim 16, wherein the plurality of entities includes a remote client that can connect to the virtual private network from a remote location.

27. A program storage device storing instructions that when executed by a computer perform a method for establishing a virtual private network for facilitating secure communications between entities over a public data network, the method comprising:
   receiving selections for a plurality of entities coupled to the public data network to include in the virtual private network;
   wherein the entities reside on local networks coupled to the public data network and are addressed through local network addresses;
   assembling a plurality of identifiers for the plurality of entities;
   defining address translation rules for virtual private network units coupled to the public data network, the virtual private network units using the address translation rules to translate local network addresses for the local networks into corresponding addresses on the public data network;
   using the plurality of identifiers to identify communications between the plurality of entities;
   transferring the communications between the plurality of entities securely over the public data network; and
   wherein transferring the communications involves using the address translation rules to translate local network addresses into addresses on the public data network.

* * * * *